United States Patent
Boutaghou et al.

(10) Patent No.: US 6,590,747 B1
(45) Date of Patent: Jul. 8, 2003

(54) SEAL FOR MICRO-ELECTRO-MECHANICAL DEVICES

(75) Inventors: Zine-Eddine Boutaghou, Vadnais Heights, MN (US); Wayne A. Bonin, North Oaks, MN (US)

(73) Assignee: Seagate Technology, LLC., Scotts Valley, CA (US)

( * ) Notice: Subject to any disclaimer, the term of this patent is extended or adjusted under 35 U.S.C. 154(b) by 0 days.

(21) Appl. No.: 09/507,136

(22) Filed: Feb. 18, 2000

Related U.S. Application Data
(60) Provisional application No. 60/149,528, filed on Aug. 17, 1999.

(51) Int. Cl.[7] ............................................... G11B 5/55
(52) U.S. Cl. ..................................... 360/294.3; 277/409
(58) Field of Search ........................... 360/294.3, 294.4, 360/294.5, 294.6, 274

(56) References Cited

U.S. PATENT DOCUMENTS

| | | | |
|---|---|---|---|
| 3,701,536 A | 10/1972 | Matthews et al. | 277/56 |
| 5,424,887 A | 6/1995 | Schuh | 360/97.03 |
| 5,552,650 A | 9/1996 | Cap et al. | 310/67 R |
| 5,768,051 A | 6/1998 | Kora et al. | 360/99.08 |
| 5,942,820 A | 8/1999 | Yoshida | 310/67 R |
| 5,946,161 A | 8/1999 | Schuh | 360/97.03 |
| 5,982,585 A * | 11/1999 | Fan et al. | 360/104 |
| 6,038,104 A * | 3/2000 | Sato et al. | 360/106 |
| 6,078,471 A * | 6/2000 | Fiske | 360/104 |
| 6,157,522 A * | 12/2000 | Murphy et al. | 360/294.6 |
| 6,198,606 B1 * | 3/2001 | Boutaghou | 360/294.3 |
| 6,208,013 B1 * | 3/2001 | Suzuki | 257/623 |
| 6,239,952 B1 * | 5/2001 | Bonin | 360/294.4 |
| 6,246,552 B1 * | 6/2001 | Soeno | 360/294.4 |

* cited by examiner

*Primary Examiner*—J. J. Swann
*Assistant Examiner*—Matthew E. Rodgers
(74) *Attorney, Agent, or Firm*—Kinney & Lange, P.A.

(57) ABSTRACT

A sealed micro-actuator device for positioning a slider in a disc drive comprises a micro-actuator body, which includes a stator, a rotor, and a motor for moving the rotor with respect to the stator. The micro-actuator device includes means for sealing the micro-actuator body to prevent debris from reaching the motor. In a preferred embodiment, the means for sealing comprises a plurality of cavities formed in the micro-actuator body and an injection molded polymer seal with a plurality of protrusions that extend into the plurality of cavities. A first subset of the plurality of protrusions make contact with the stator, thereby holding the means for sealing in place. A second subset of the plurality of protrusions extend into cavities formed in the rotor. The second subset of protrusions does not contact the rotor. In an alternative preferred embodiment, a first and a second surface of the rotor are recessed from a first and a second surface of the stator, and the means for sealing comprises a first flexible film heat sealed to the first surface of the stator and a second flexible film heat sealed to the second surface of the stator. In another alternative embodiment, a sealed actuator is incorporated into a slider of a disc drive. The slider comprises a slider body, a data transfer element, and an actuator. The data transfer element transfers data to or from a magnetic medium. The actuator is coupled between the slider body and the data transfer element. The actuator is operable to move the data transfer element relative to the slider body. The slider includes sealing means to prevent debris from reaching the actuator.

29 Claims, 7 Drawing Sheets

SEAL FOR MICRO-ELECTRO-MECHANICAL DEVICES

CROSS-REFERENCE TO RELATED APPLICATION(S)

This application claims the benefit of the filing date of U.S. provisional application serial No. 60/149,528 entitled "LABYRINTH SEAL DESIGN FOR MEMS DEVICE," which was filed Aug. 17, 1999.

BACKGROUND OF THE INVENTION

The present invention relates to a disc drive micro-actuator, and more particularly to a sealed micro-actuator which provides a contaminant free environment for proper operation.

The density of concentric data tracks on magnetic discs continues to increase (that is, the width of data tracks and radial spacing between data tracks are decreasing), requiring more precise radial positioning of the head. Conventionally, head positioning is accomplished by operating an actuator arm with a large-scale actuation motor, such as a voice coil motor, to radially position a head on a flexure at. the end of the actuator arm. The large-scale motor lacks sufficient resolution to effectively accommodate high track-density discs. Thus, a high resolution head positioning mechanism, or micro-actuator, is necessary to accommodate the more densely spaced tracks.

Electro-static micro-actuators rely on a contaminant free environment to function properly. The large electro-static charge required to actuate the combs or electrodes of a micro-actuator can attract debris. The debris can cause a short and a failure of the device.

Certain mechanical micro-actuator devices, such as accelerometers, that do not have to interact mechanically with the outside world are easy to seal up. The device is put in a cavity and sealed therein. However, micro-actuator devices such as those used in a disc drive head must interact with the outside world and cannot be completely packaged within a cavity.

Currently, no satisfactory solutions exist for sealing disc drive micro-actuator devices. One method that has been proposed for sealing a micro-electro-mechanical system (MEMS) involves wafer bonding of the MEMS device after it has been fabricated. During wafer to wafer bonding, cavities are etched in a first wafer that correspond to areas that are to be encapsulated in a second wafer. The first wafer is then bonded across-the top of the second wafer. For wafer to wafer bonding to work, the wafers have to be very smooth and flat at the atomic level. In the long range, the wafers have to be flat, and in the short range, the wafers have to be smooth (i.e., within about an angstrom of roughness), or the wafers will not properly bond. In addition, metal lines are occasionally put down on the surface of MEMS devices which makes it very difficult to obtain the necessary flatness for wafer to wafer bonding. Therefore, wafer to wafer bonding does not present a satisfactory solution for sealing disc drive micro-actuator devices.

BRIEF SUMMARY OF THE INVENTION

A sealed micro-actuator device for positioning a slider in a disc drive comprises a micro-actuator body, which includes a stator, a rotor, and a motor for moving the rotor with respect to the stator. The micro-actuator device includes means for sealing the micro-actuator body to prevent debris from reaching the motor. In a preferred embodiment, the means for sealing comprises a plurality of cavities formed in the micro-actuator body and an injection molded polymer seal with a plurality of protrusions that extend into the plurality of cavities. A first subset of the plurality of protrusions make contact with the stator, thereby holding the means for sealing in place. A second subset of the plurality of protrusions extend into cavities formed in the rotor. The second subset of protrusions does not contact the rotor.

In an alternative preferred embodiment, a first and a second surface of the rotor are recessed from a first and a second surface of the stator, and the means for sealing comprises a first flexible film heat sealed to the first surface of the stator and a second flexible film heat sealed to the second surface of the stator.

In another alternative embodiment, a sealed actuator is incorporated into a slider of a disc drive. The slider comprises a slider body, a data transfer element, and an actuator. The data transfer element transfers data to or from a magnetic medium. The actuator is coupled between the slider body and the data transfer element. The actuator is operable to move the data transfer element relative to the slider body. The slider includes sealing means to prevent debris from reaching the actuator.

DETAILED DESCRIPTION

Figure 1:
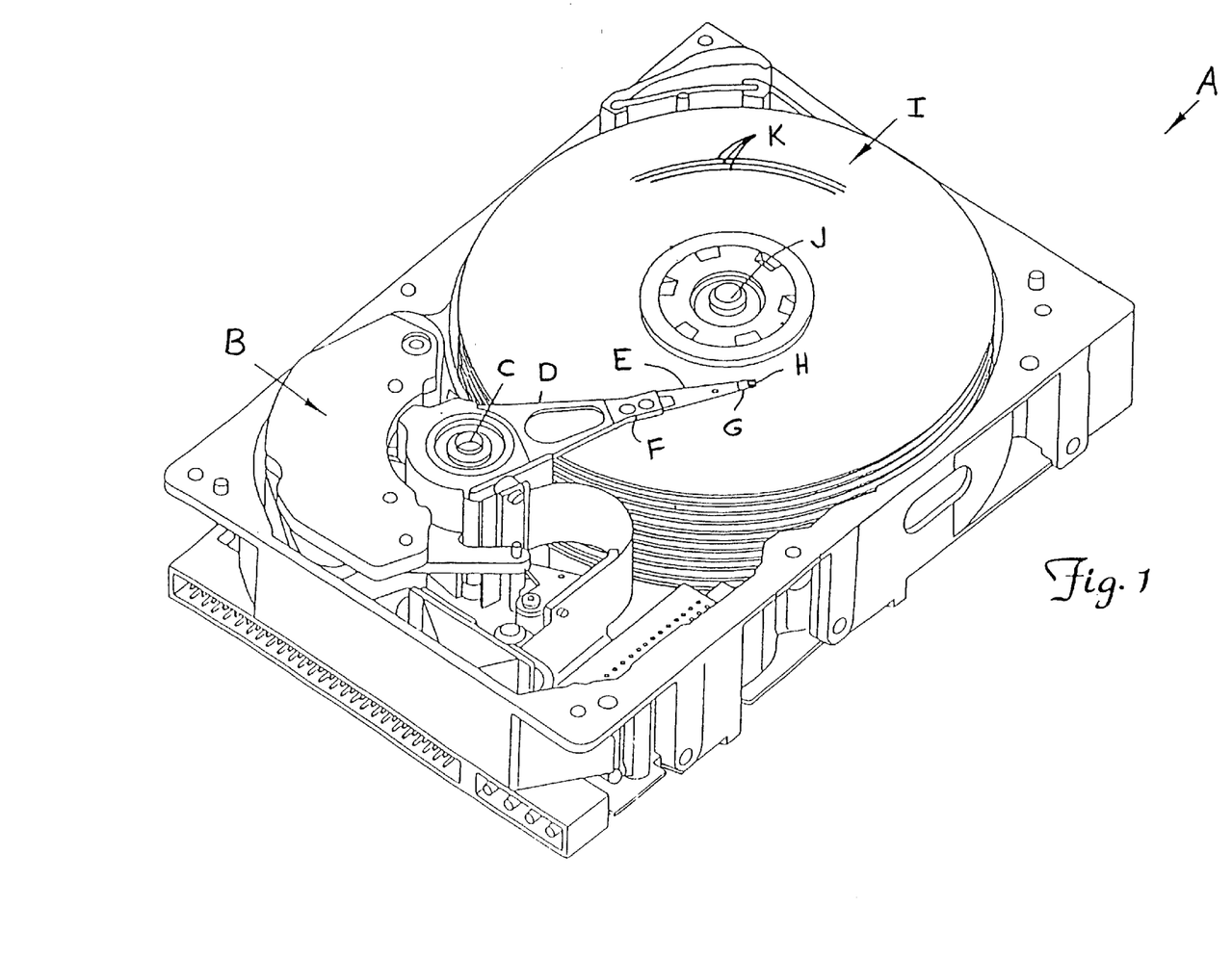
FIG. 1 shows a perspective view of a disc drive including a dual-stage disc drive actuation system.

FIG. 1 is a perspective view of a disc drive A including a dual-stage disc drive actuation system for positioning a head-carrying slider over a track K of disc I. Disc drive A includes voice coil motor (VCM) B arranged to rotate actuator arm D on a spindle around axis C. Head suspension E is connected to actuator arm D at head mounting block F. A micro-actuator is attached to load beam E by flexure G and carries slider H, which in turn carries a transducing head for reading and/or writing data on concentric tracks of disc I. Disc I rotates around axis J, so that windage is encountered by slider H to keep it aloft a small distance above the surface of disc I.

VCM B is selectively operated to move actuator arm D around axis C, thereby moving the transducing head carried by slider H between tracks K of disc I. However, for disc drive systems with high track density, VCM B lacks sufficient resolution and frequency response to position the transducing head on slider H precisely over a selected track K of disc I. Therefore, a higher resolution micro-actuator is used.

Figure 2:
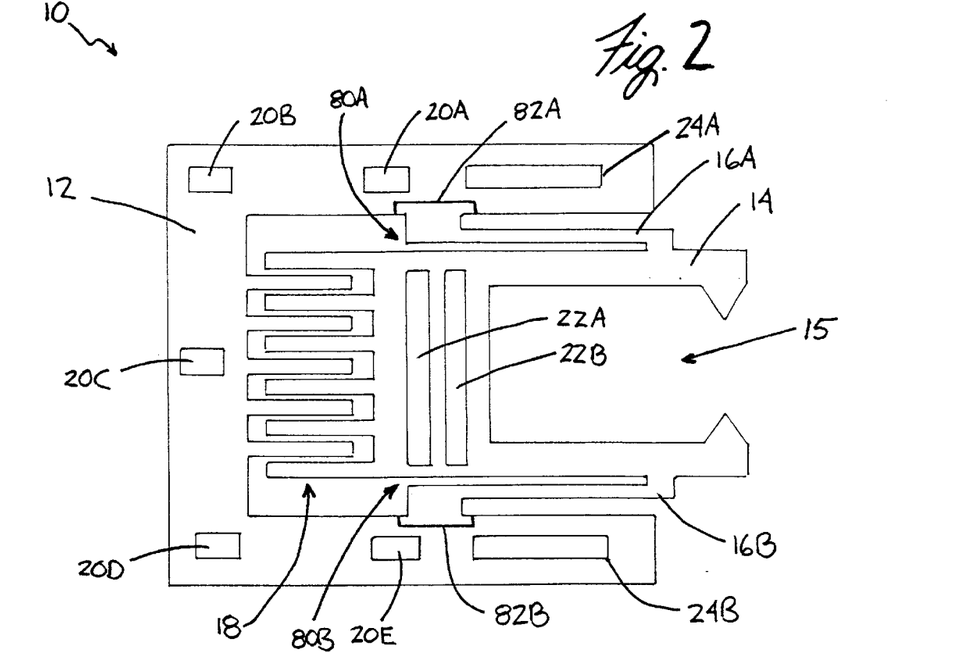
FIG. 2 shows a micro-actuator capable of being sealed according to the present invention.

FIG. 2 shows a disc drive micro-actuator capable of being sealed according to the present invention. Micro-actuator 10 includes stator 12, rotor 14, support arms 16A and 16B, electrodes 18, and standoffs 24A and 24B. The electrodes 18 shown in FIG. 2 are a simplified representation of a micro-actuator motor. Rotor 14 is attached to stator 12 by support arms 16A and 16B. In operation, a voltage is applied to the electrodes 18 that extend out from stator 12, which results in a voltage difference between the electrodes 18 that extend out from stator 12 and the electrodes 18 that extend out from rotor 14. The voltage difference produces an electrical field, causing an attractive force between the electrodes 18 of stator 12 and the electrodes 18 of rotor 14. Thus, electrodes 18 act as a motor, producing an attractive force that causes movement of rotor 14. In a completed disc drive assembly, micro-actuator 10 is attached to flexure G (see FIG. 1) at standoffs 24A and 24B, and a slider H is positioned within opening 15 of rotor 14.

In order to seal micro-actuator 10, holes are preferably made in the device which correspond to protrusions of a seal. Micro-actuator 10 includes openings 20A–20E and trenches 22A and 22B for receiving protrusions of a seal.

Openings 20A–20E and trenches 22A–22B are preferably formed using deep reactive ion etching (DRIE). The openings 20A–20E and trenches 22A–22B can be fabricated during the fabrication process of micro-actuator 10.

Figures 3, 4:
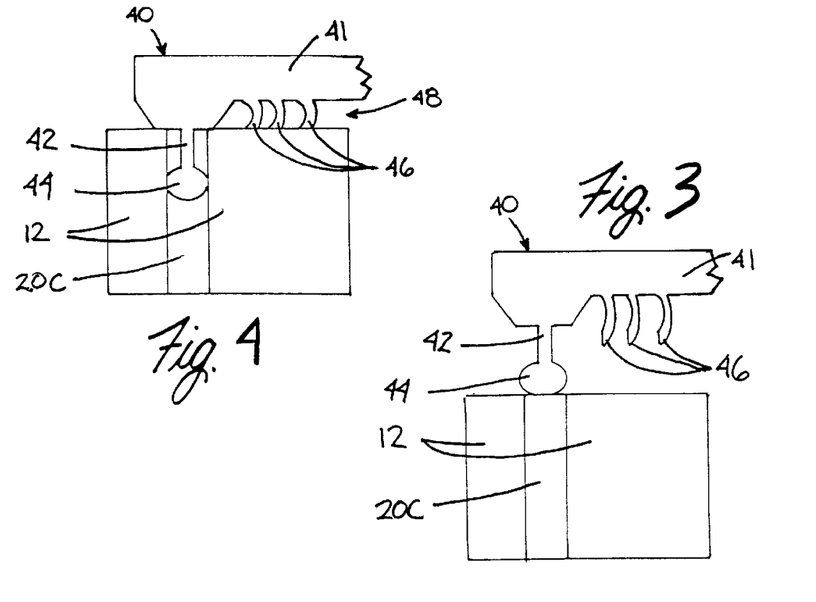
FIG. 3 shows a cross-section of a portion of the stator and a portion of a seal according to the present invention, prior to insertion of the seal into the micro-actuator.
FIG. 4 shows a cross-section of a portion of the stator and seal after insertion of the seal into the micro-actuator.

FIG. 3 shows a cross-section of a portion of stator 12 and a portion of a seal according to the present invention, prior to insertion of the seal into micro-actuator 10. Seal 40 includes body 41, neck 42, locking mechanism 44 and walls 46. Locking mechanism 44 is generally spherical in shape, and is attached to seal body 41 by neck 42. Seal 40 is preferably a transparent, flexible rubber formed by an injection molding process. The transparency of seal 40 facilitates quality control of the device.

New advances in polymer injection molding technology have permitted the injection molding of micron size features, such as neck 42, locking mechanism 44, and walls 46. Silicon wafers are fabricated as molds for forming polymer-based micro-devices like seal 40. The polymer-based micro-devices are then used to seal silicon based micro-devices, such as micro-actuator 10. The ability to injection mold micron size features is important in order to properly seal devices with small gaps such as disc drive micro-actuators.

FIG. 4 shows a cross-section of a portion of stator 12 and seal 40 after insertion of the seal into micro-actuator 10. After insertion into opening 20C of stator 12, locking mechanism 44 is compressed by the walls of opening 20C. The compression force exerted by the walls of opening 20C on locking mechanism 44 holds locking. mechanism 44 in place, and correspondingly holds seal 40 in place. Walls 46 are also compressed as seal 40 is inserted into micro-actuator 10. Attachment of seal 40 to micro-actuator 10 as shown in FIG. 4 results in a sealed area 48 which will remain free from debris during operation.

The portion of seal 40 shown in FIGS. 3 and 4 is only one portion of the entire seal 40. In a preferred embodiment, seal 40 includes five locking mechanisms 44. Each of the five locking mechanisms 44 is inserted into one of openings 20A–20E of micro-actuator 10. The body 41 of seal 40 extends over substantially the entire top surface of micro-actuator 10. After seal 40 is inserted into micro-actuator 10, there is a gap between the body 41 of seal 40 and the top surface of stator 12 in the region between adjacent openings 20A–20E. However, no debris can pass through this gap and reach electrodes 18 because walls 46 extend down from the body 41 of seal 40 and make contact. with the top surface of stator 12. Walls 46 extend around substantially the entire perimeter of stator 12 and prevent debris from reaching electrodes 18.

Figures 5, 6:
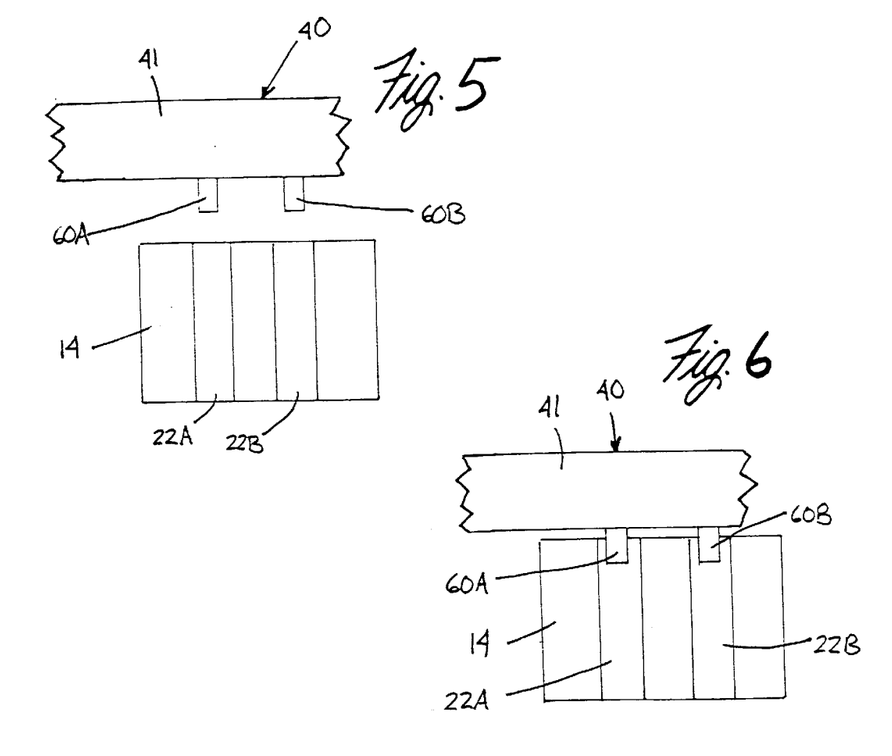
FIG. 5 shows a cross-section of a portion of the seal that is positioned over the rotor, prior to insertion of the seal into the micro-actuator.
FIG. 6 shows a cross-section of a portion of the rotor after the seal has been inserted into micro-actuator.

FIG. 5 shows a cross-section of a portion of the seal that is positioned over the rotor, prior to the insertion of the seal into the micro-actuator. The portion of seal 40 shown in FIGS. 3 and 4 makes contact with micro-actuator 10. The portion of seal 40 shown in FIGS. 5 and 6 covers the top surface of part of micro-actuator 10, but does not contact micro-actuator 10. The portion of seal 40 shown in FIGS. 5 and 6 includes walls 60A and 60B, which extend down from the body 41 of seal 40.

FIG. 6 shows a cross-section of a portion of rotor 14 after seal 40 has been inserted into micro-actuator 10. Walls 60A and 60B extend into trenches 22A and 22B of rotor 14, but walls 60A and 60B do not make contact with rotor 14. Walls 60A and 60B provide a resistance path to free flowing debris in the disc drive, while not affecting the movement of rotor 14. In order to reach electrodes 18, debris must go around walls 60A and 60B. An increase in the number of walls 60 increases the probability of debris,containment away from electrodes 18.

Referring again to FIG. 2, because rotor 14 must move relative to stator 12, there must be gaps between rotor 14 and stator 12 to allow this motion. As shown in FIG. 2, gaps 80A and 80B (collectively referred to as gaps 80) are located between rotor 14 and stator 12. Due to the existence of gaps 80, it is not possible to seal micro-actuator 10 entirely, and there is a probability that debris will go through gaps 80 or will get trapped therein. Gaps 80A and 80B must remain unobstructed for proper operation of micro-actuator 10. To limit the probability of debris passing through gaps 80, isolation trenches 82A and 82B can be formed in stator 12 near the region of gaps 80 to ensure that stator 12 and rotor 14 are grounded near gaps 80. Grounding stator 12 and rotor 14 in the region of gaps 80 eliminates attractive forces that might cause debris to be attracted towards the gaps. Isolation trenches 82A and 82B are preferably formed by etching a trench in stator 12, and then filling the trench with an insulating material such as $SiO_2$ or $Si_3N_4$. The formation of isolation trenches 82A and 82B does not require an additional process step, but merely requires a mask change.

Figure 7:
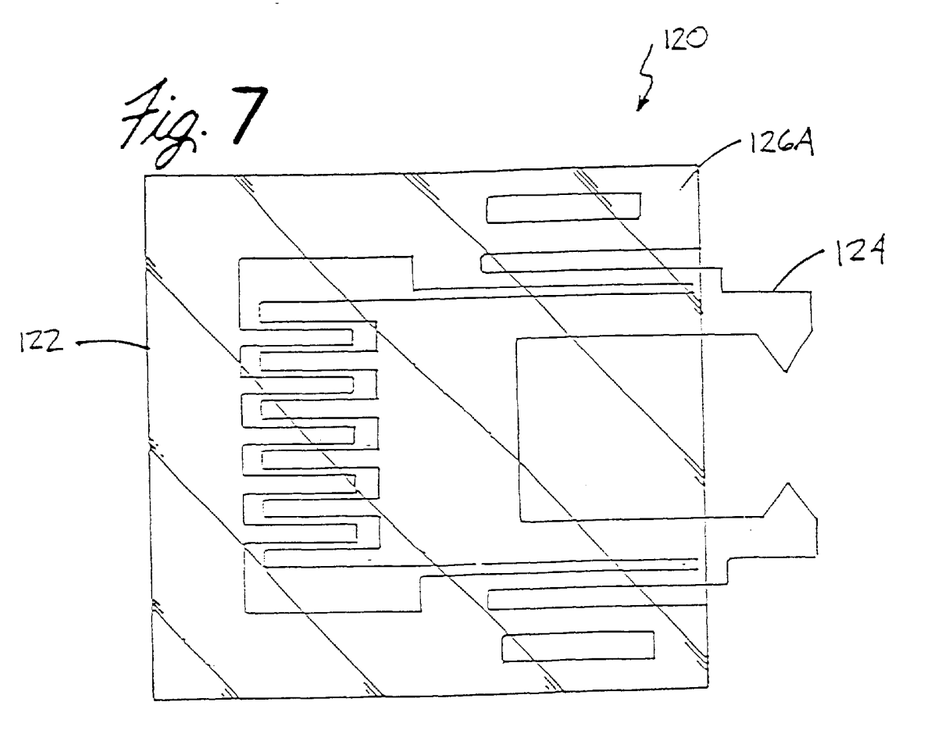
FIG. 7 shows a top view of an alternative embodiment of a sealed micro-actuator.
Figure 8:
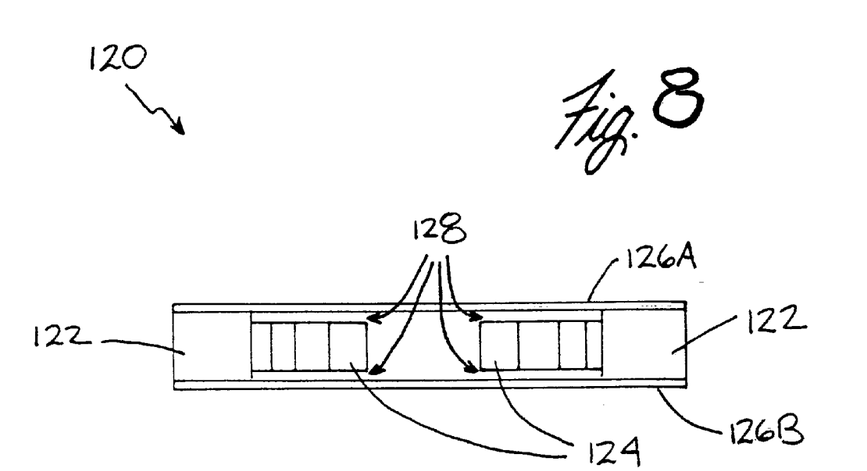
FIG. 8 shows a side view of the micro-actuator shown in FIG. 7.

FIGS. 7 and 8 show an alternative embodiment of a sealed micro-actuator. FIG. 7 shows a top view of sealed micro-actuator 120. In a top view like FIG. 7, seal 40 appears the same as seal 126A, with the body 41 of seal 40 extending over the entire top surface of the micro-actuator.

Micro-actuator 120 includes stator 122, rotor 124 and seals 126A and 126B (seal 126B is visible in FIG. 8). FIG. 8 shows a side view of micro-actuator 120. As can be seen in FIG. 8, rotor 124 is etched so that it is recessed slightly from the top and the bottom surface of stator 122, resulting in recesses 128. Seals 126A and 126B are then placed over the top and the bottom surfaces of stator 122 and heat sealed thereto. In a preferred embodiment, seals 126A and 126B are a Dupont Mylar® polyester film, which is available in thicknesses down to approximately 1 micrometer. Such Mylar films bond to both silicon and $SiO_2$. By etching rotor 124 to produce recesses 128, rotor 124 is not bonded to seals 126A and 126B and remains free to move. After sealing micro-actuator 120, the only path for particles to enter the micro-actuator is through the narrow gap between seals 126A–126B and rotor 124, which is preferably about 10 micrometers. In an alternative embodiment, a single sealing film 126A may be used to block debris.

Seals 126A and 126B also act as deflection limiters, which protect rotor 124 from Z-axis (i.e., into or out of the page) overstress in the event of a severe shock loading. Seals 126A and 126B, made of a Mylar polyester film, are more compliant than a more rigid deflection limiter, such as metal or silicon. Therefore, if rotor 124 comes in contact with seal 126A or 126B, the seal will tend to limit the deflection and produce less stress in rotor 124 than a more rigid deflection limiter would generate.

Figure 9:
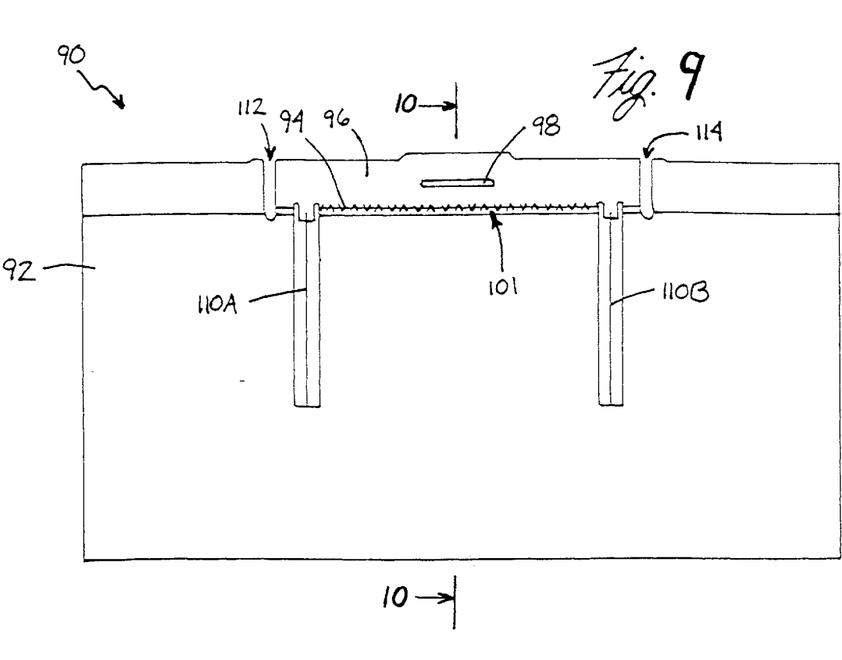
FIG. 9 shows a slider that includes a micro-actuator for moving a read/write element.
Figure 10:
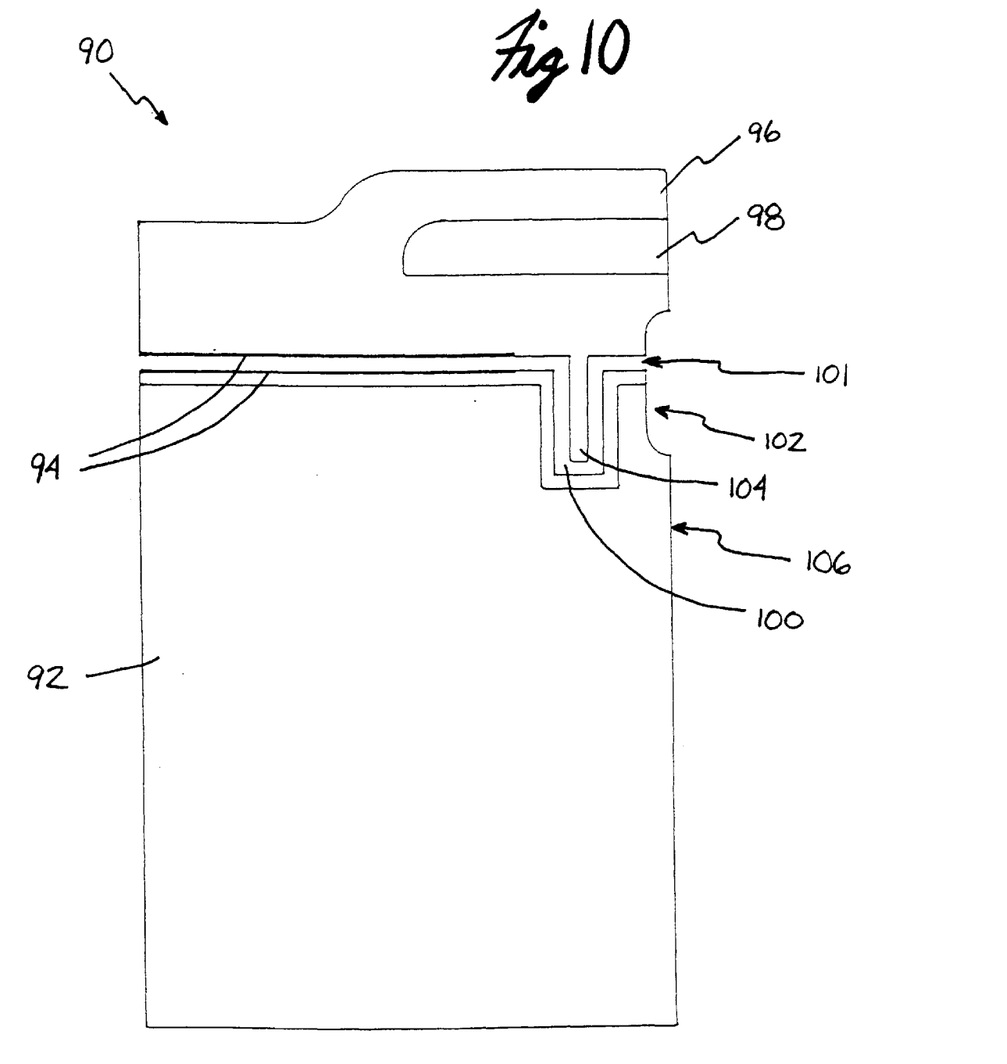
FIG. 10 shows a cross-sectional view of the slider shown in FIG. 9.

In a completed disc drive assembly, the micro-actuator 10 discussed above with respect to FIG. 2 is coupled to a slider and causes movement of the entire slider. In contrast, FIGS. 9 and 10 show a slider that includes a micro-actuator for moving a read/write or data transfer element. Therefore, only the read/write element is moved and not the entire slider.

FIG. 9 shows slider 90 which includes slider body 92, micro-actuator 94, insulator 96, read/write element 98, suspension springs 110A and 110B, cavity 112 and cavity 114. Slider 90 is viewed from the perspective of a disc, looking at the air bearing surface (ABS) of slider 90. Read/write element 98 is encapsulated by insulator 96, which is $Al_2O_3$ in a preferred embodiment. Insulator 96 and read/write element 98 are coupled to slider body 92 by springs 110A and 110B. Micro-actuator 94 moves insulator 96 and read/write element 98 to the left and right between cavities 112 and 114. As can be seen in FIG. 9, there is a narrow gap 101 between insulator 96 and slider body 92. Micro-actuator 94 is located within gap 101, and is recessed from the ABS. Debris can go through gap 101 and interfere with the operation of micro-actuator 94. Therefore, a labyrinth seal is formed in gap 101 between the ABS and micro-actuator 94. The labyrinth seal is visible in FIG. 10.

FIG. 10 is a cross-sectional view of slider 90 viewed from section lines 9—9 shown in FIG. 9. Slider 90 includes slider body 92, micro-actuator 94, insulator 96, read/write element 98, cavity 100, trench 102, protrusion 104 and ABS 106. For clarity, trench 102 was not shown in FIG. 9. Micro-actuator 94 is positioned between slider body 92 and insulator 96, and is recessed from ABS 106. Micro-actuator 94 causes insulator 96 and read/write element 98 to move into and out of the page. Trench 102 provides a place for disc lubricants and debris to build up without reaching micro-actuator 94. In addition, cavity 100 is formed in slider body 92. Protrusion 104 extends from insulator 96 into cavity 100, thereby forming a labyrinth seal between ABS 106 and micro-actuator 94 which prevents debris from going through gap 101 and reaching micro-actuator 94.

In addition to being applied to disc drive micro-actuators, the means for sealing disclosed herein may also be applied to other types of MEMS technologies, such as capacitance sensing devices that act as position sensors, or any other micro-device that relies on a contaminant free environment to function properly.

Although the present invention has been described with reference to preferred embodiments, workers skilled in the art will recognize that changes may be made in form and detail without departing from the spirit and scope of the invention.

What is claimed is:

1. A sealed micro-actuator device for positioning a data transfer element in a disc drive, the data transfer element coupled to a rotor, the rotor movable relative to a stator, the micro-actuator device comprising:

a motor for moving the rotor relative to the stator; and a flexible, polymeric seal for preventing debris from reaching the motor.

2. A sealed micro-actuator device for positioning a data transfer element in a disc drive, the data transfer element coupled to a rotor, the rotor movable relative to a stator, the micro-actuator device comprising:

a motor for moving the rotor relative to the stator;

a plurality of cavities formed in the micro-actuator device; and an injection molded polymer seal with a plurality of protrusions that extend into the plurality of cavities wherein the seal prevents debris from reaching the motor.

3. The micro-actuator device of claim 2 wherein the plurality of cavities are formed by reactive ion etching.

4. The micro-actuator device of claim 2 wherein a first subset of the plurality of protrusions make contact with the stator, thereby holding the seal in place, and wherein a second subset of the plurality of protrusions extend into cavities formed in the rotor, the second subset of protrusions not contacting the rotor.

5. The micro-actuator device of claim 2 wherein the injection molded polymer seal further comprises at least one flexible wall that is compressed against the stator.

6. The micro-actuator device of claim 1, and further comprising means for grounding the stator and the rotor near unsealed regions of the micro-actuator device.

7. A sealed micro-actuator device for positioning a data transfer element in a disc drive, the micro-actuator device comprising:

a stator having a first surface;

a rotor coupled to the data transfer element, the rotor movable relative to the stator wherein a first surface of the rotor is recessed from the first surface of the stator;

a motor for moving the rotor relative to the stator; and a first flexible film sealed to the first surface of the stator for preventing debris from reaching the motor.

8. The micro-actuator device of claim 7 wherein a second surface of the rotor is recessed from a second surface of the stator, and further comprising a second flexible film sealed to the second surface of the stator for preventing debris from reaching the motor.

9. The micro-actuator device of claim 8 wherein the first and the second flexible films are a polymeric film.

10. The micro-actuator device of claim 1 wherein the stator is a slider.

11. The micro-actuator device of claim 10 wherein the seal comprises a labyrinth seal positioned between the motor and an air bearing surface of the slider.

12. A method of sealing a micro-actuator device, the micro-actuator device including a micro-actuator body having a stator, a rotor, and a motor for moving the rotor with respect to the stator, the micro-actuator device operable to position a slider in a disc drive, the method comprising:

providing a flexible, polymeric seal; and mounting the polymeric seal to the stator of the micro-actuator body, such that the polymeric seal does not interfere with the movement of the rotor relative to the stator.

13. The method of claim 12 wherein the polymeric seal includes a plurality of protrusions, the method further comprising:

forming a plurality of cavities in the micro-actuator body; and inserting the plurality of protrusions of the polymeric seal into the plurality of cavities in the micro-actuator body.

14. The method of claim 13 wherein the plurality of cavities in the micro-actuator body are formed by reactive ion etching.

15. The method of claim 13 wherein a first subset of the plurality of protrusions make contact with the stator, and a second subset of the plurality of protrusions extend into cavities formed in the rotor, the second subset of protrusions not contacting the rotor.

16. The method of claim 13 wherein the polymeric seal is formed by injection molding.

17. The method of claim 13 wherein the polymeric seal further comprises at least one flexible wall that is compressed against the stator.

18. The method of claim 12 and further comprising forming an isolation trench in the micro-actuator body near an unsealed region of the micro-actuator device, the isolation trench grounding the micro-actuator body near the unsealed region of the micro-actuator device.

19. The method of claim 12 wherein a first surface of the rotor is recessed from a first surface of the stator.

20. A method of sealing a slider, the slider including an actuator operable to move a data transfer element with respect to a slider body in a disc drive, the data transfer element transferring data to or from a magnetic medium, the data transfer element encompassed by an insulator, the method comprising:

forming a cavity in the slider body between the actuator and an air bearing surface of the slider; and forming a protrusion that extends from the insulator into the cavity.

21. A sealed micro-actuator device for positioning a data transfer element in a disc drive, the data transfer element coupled to a rotor, the rotor movable relative to a stator, the micro-actuator device comprising:

a motor for moving the rotor relative to the stator; and a flexible, polymeric seal mounted to the micro-actuator device wherein the seal prevents debris from reaching the motor.

22. The micro-actuator device of claim 21 wherein a plurality of cavities are formed in the micro-actuator device and a plurality of protrusions extend from the seal into the plurality of cavities.

23. The micro-actuator device of claim 22 wherein a first subset of the plurality of protrusions make contact with the stator, thereby holding the seal in place, and wherein a second subset of the plurality of protrusions extend into cavities formed in the rotor, the second subset of protrusions not contacting the rotor.

24. The micro-actuator device of claim 22 wherein the seal further comprises at least one flexible wall that is compressed against the stator.

25. The micro-actuator of claim 21, and further comprising an isolation trench formed in the micro-actuator device near an unsealed region of the micro-actuator device, the isolation trench grounding the stator and the rotor near the unsealed region.

26. The micro-actuator of claim 21 wherein a first surface of the rotor is recessed from a first surface of the stator and the seal comprises a first flexible film mounted to the first surface of the stator.

27. The micro-actuator of claim 26 wherein a second surface of the rotor is recessed from a second surface of the stator and the seal further comprises a second flexible film mounted to the second surface of the stator.

28. The micro-actuator of claim 21 wherein the stator is a slider.

29. The micro-actuator of claim 28 wherein the seal is a labyrinth seal positioned between the motor and an air bearing surface of the slider.

* * * * *

UNITED STATES PATENT AND TRADEMARK OFFICE
CERTIFICATE OF CORRECTION

PATENT NO.    : 6,590,747 B1  Page 1 of 1
DATED         : July 8, 2003
INVENTOR(S)   : Zine-Eddine Boutaghou et al.

It is certified that error appears in the above-identified patent and that said Letters Patent is hereby corrected as shown below:

<u>Title page,</u>
Item [73], Assignee, delete "," after "Technology"

Signed and Sealed this

Sixteenth Day of December, 2003

JAMES E. ROGAN
*Director of the United States Patent and Trademark Office*